(12) United States Patent
Michioka et al.

(10) Patent No.: US 6,602,166 B2
(45) Date of Patent: Aug. 5, 2003

(54) SLIP LIMITER DEVICE FOR TORQUE CONVERTER

(75) Inventors: Hirofumi Michioka, Fujisawa (JP); Toshiya Mori, Fuji (JP)

(73) Assignee: Jatco Ltd, Fuji (JP)

(*) Notice: Subject to any disclaimer, the term of this patent is extended or adjusted under 35 U.S.C. 154(b) by 0 days.

(21) Appl. No.: 10/132,969

(22) Filed: Apr. 26, 2002

(65) Prior Publication Data

US 2002/0160882 A1 Oct. 31, 2002

(30) Foreign Application Priority Data

Apr. 26, 2001 (JP) .......................... 2001-128816

(51) Int. Cl.[7] .............................................. F16H 61/14
(52) U.S. Cl. ........................................ 477/168; 477/176
(58) Field of Search .............................. 477/168, 169, 477/174, 176, 180, 76; 192/82 T

(56) References Cited

U.S. PATENT DOCUMENTS 5,882,279 A * 3/1999 Ueki ........................... 477/168
5,954,618 A * 9/1999 Mikami et al. ............. 477/176
6,019,703 A * 2/2000 Black et al. ................ 477/168
6,146,309 A * 11/2000 Nishino et al. ............ 477/168

FOREIGN PATENT DOCUMENTS

| JP | 04-151069 | 5/1992 |
| JP | 07-229556 | 8/1995 |

* cited by examiner

Primary Examiner—Sherry Estremsky
(74) Attorney, Agent, or Firm—Klarquist Sparkman, LLP

(57) ABSTRACT

A device for limiting slip of a torque converter at its high temperature condition performs a slip limiting control by reducing slip rotation between an input element and an output element of the torque converter in a low-load operation region of an engine is carried out, or a lockup control for eliminating the slip rotation. The region of the slip control is expanded to a high-load operation region of the engine, when the temperature of torque converter hydraulic oil is not lower than a predetermined temperature.

16 Claims, 3 Drawing Sheets

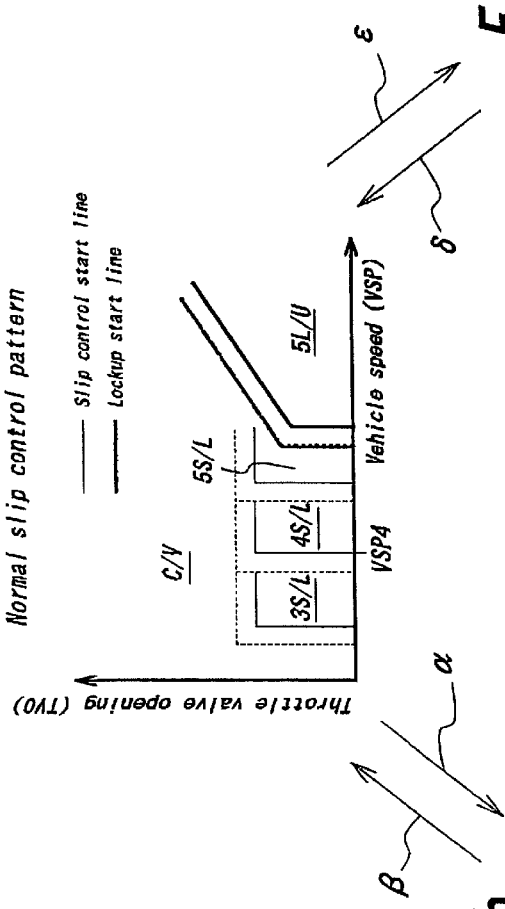
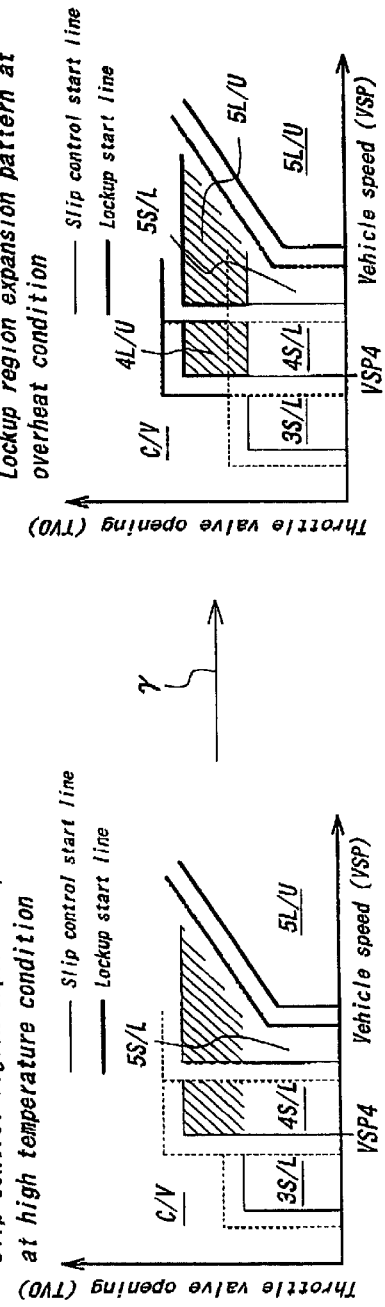
FIG. 3a Normal slip control pattern
FIG. 3b Slip control region expansion pattern at high temperature condition
FIG. 3c Lockup region expansion pattern at overheat condition

SLIP LIMITER DEVICE FOR TORQUE CONVERTER

BACKGROUND OF THE INVENTION

1. Field of the Invention

The present invention relates to a device for limiting slip of a torque converter for an automatic transmission in a high temperature condition.

2. Description of Related Art

A slip limiter device conventionally used as countermeasures against high temperature is disclosed, for example, in JP 04-151069A, which is applied to a lockup-type torque converter for an automatic transmission. As generally known in the art, a lockup-type torque converter is changed from a converter mode to a lockup mode in which an input element and an output element are directly coupled to each other (i.e., the slip rotation of the torque converter is zero) in a vehicle speed zone above a predetermined lock-up vehicle speed, where torque multiplying function and torque fluctuation absorbing function of torque converter are not required. The slip limiter device as disclosed in JP 04-151069A is operative when the hydraulic oil is in a high temperature condition, to lower the lock-up vehicle speed so that the torque converter can be readily locked-up thereby suppressing heat generation due to intense agitation of the hydraulic oil by the torque converter.

On the other hand, if the countermeasures against high temperature and overheating as described above are implemented based on the hydraulic oil temperature, these countermeasures are proper to an extent that a high-load operation of the vehicle is continued for a long period of time. In other words, when the high-load operation of the vehicle takes place only temporarily, even though a high temperature has been once attained, the temperature decreases in a short time so that the countermeasures tend to cause undesirable hunting. From such a viewpoint, an improvement has been proposed in JP 07-229556A, for example, wherein the high temperature countermeasures are implemented only when the high-load operation of the vehicle is continued for a long period of time.

However, if the torque converter is locked up at the time of high-load operation in this manner, the slip rotation of the torque converter becomes zero and, hence, the torque fluctuation absorbing function is not achieved at all, so that booming noise and/or shaking vibration that are liable to occur at the time of high-load operation are directly transmitted to a vehicle body, thereby deteriorating drivability or driving comfort.

On the other hand, if the torque converter is placed in a converter mode in which the slip rotation is not limited at all during a high-load condition, to thereby maintain satisfactory drivability or driving comfort, the hydraulic oil is intensively agitated by the torque converter so that the overheating countermeasures cannot be fully achieved.

SUMMARY OF THE INVENTION

It is therefore a primary object of the present invention to provide an improved slip limiter device, which effectively eliminates the above-mentioned problems of the prior art.

It is a more specific object of the present invention to provide an improved slip limiter device, by which the measures against overheating can be implemented without deteriorating the drivability, and thus both of the measures against deteriorated drivability and driving feel, as well as the measures against overheating can be taken at the same time.

In search for a solution of these objects, the inventors conducted thorough research and investigations and arrived at an insight that it would be highly advantageous to limit the slip of the torque converter in a high temperature condition, by expanding the slip control region in which the slip rotation of torque converter is decreased to a high-load operation region, instead of the conventional approach of shifting the lockup vehicle speed toward the low vehicle speed side and thereby expanding the lockup region in which the slip rotation of torque converter is made zero, such that agitation of the hydraulic oil is alleviated by the decreased slip rotation at the time of high-load operation to thereby implement measures against overheating without deteriorating the drivability and driving feel.

According to the present invention, there is provided a slip limiter device for limiting slip of a torque converter in a high temperature condition thereof, by carrying out slip control for reducing slip rotation between an input element and an output element of said torque converter in a low-load operation region of an engine, or a lockup control for directly coupling said input and output elements to eliminate said slip rotation, wherein said slip control is carried out in a region which is expanded to a high-load operation region of the engine when torque converter hydraulic oil is at a temperature not lower than a predetermined temperature.

With the slip limiter device according to the present invention, the slip control for reducing the slip rotation between the input and output elements of the torque converter in the low-load operation region of an engine is carried out, or the lockup control for eliminating the slip rotation is carried out. When the torque converter hydraulic oil temperature is not lower than the predetermined temperature, the region of the slip control is expanded to the high-load operation region.

Owing to the expansion of the slip control region to the high-load operation region, the torque converter has a tendency of decreased slip rotation during the high-load operation, so that agitation of the hydraulic oil caused by the torque converter is alleviated by the decreased slip rotation, thereby allowing the high temperature measures to be taken. Moreover, since such a functional effect can be achieved by the expansion of the slip control region, it is possible to avoid undesirable deterioration in drivability and/or driving feel, which had been inevitable when the lockup region is expanded in a conventional manner. Thus, both of the measures against deteriorated drivability and/or driving feel, as well as the measures against overheating can be taken at the same time.

It is preferred that the slip control region be expanded when the torque converter hydraulic oil temperature is not lower than the predetermined temperature at least for a predetermined time. By this, the expansion of the slip control region toward the high load side is performed only when it is really necessary, and not wastefully.

It is additionally or alternatively preferred that the torque converter is placed in a lockup mode in the expanded region when the torque converter hydraulic oil temperature is not sufficiently decreased even by the expansion of said slip control region. By this, when a decrease in the oil temperature due to the expansion of the slip control region is not found, the agitation of the hydraulic oil is further alleviated by the further decreased slip rotation, thereby allowing reliable overheat countermeasures to be taken.

In this instance, the control is preferably returned from the lockup control in which the torque converter is placed in the lockup mode, to the slip limiting control based on a normal slip limiting region pattern, when the torque converter hydraulic oil temperature is sufficiently decreased by the lockup control in which the torque converter is placed in the lockup mode in the expanded region. By this, the control for placing the torque converter in the lockup mode in the expanded region can be finished properly, and the restoration to the normal slip limitation can be effected in a reliable manner.

The restoration to the normal slip limiting control is preferably executed when the operating condition is in a region other than the expanded slip limiting region, so that the torque converter is in the same slip limiting mode upon restoration to the normal slip limitation and before such restoration, and the restoration to the normal slip limitation can be effected substantially without shock.

It is additionally or alternatively preferred that the torque converter is placed in the lockup mode in the expanded region when the expansion of the slip control region continues at least for a predetermined time. This serves to avoid a problem that the slip control mode is continued for an excessively long period of time by the expansion of the slip control region toward the high load side.

In this instance also, the control is preferably returned from the lockup control to the slip limiting control based on a normal slip limiting region pattern, when the torque converter hydraulic oil temperature is sufficiently decreased by the lockup control in which the torque converter is placed in the lockup mode in the expanded region, and the restoration to the normal slip limiting control is preferably executed when the operating condition is in a region other than the expanded slip limiting region, to thereby bring about the functional advantages mentioned above.

It is additionally or alternatively preferred that the control is returned from a slip limiting control based on an expanded slip limiting region pattern in which the slip control region is expanded, to a normal slip limiting control based on a normal slip limiting region pattern, when the torque converter hydraulic oil temperature is sufficiently decreased the expansion of the slip control region. By this, the control for making the torque converter in the lockup mode in the expanded region can be finished properly, and the restoration to the normal slip limitation can be effected in a reliable manner.

In this instance also, the restoration to the normal slip limiting control is preferably executed when the operating condition is in a region other than said expanded slip limiting region, to thereby bring about the functional advantage mentioned above.

BRIEF DESCRIPTION OF THE DRAWINGS

The present invention will be further explained below with reference to a preferred embodiment shown in the accompanying drawings.

FIG. 3a is a diagram of a normal slip limiting region for a normal hydraulic oil temperature.

FIG. 3b is a diagram of a slip limiting region for a high hydraulic oil temperature.

FIG. 3c is a diagram of a slip limiting region for a still higher hydraulic oil temperature.

DETAILED DESCRIPTION OF THE PREFERRED EMBODIMENT

Figure 1:
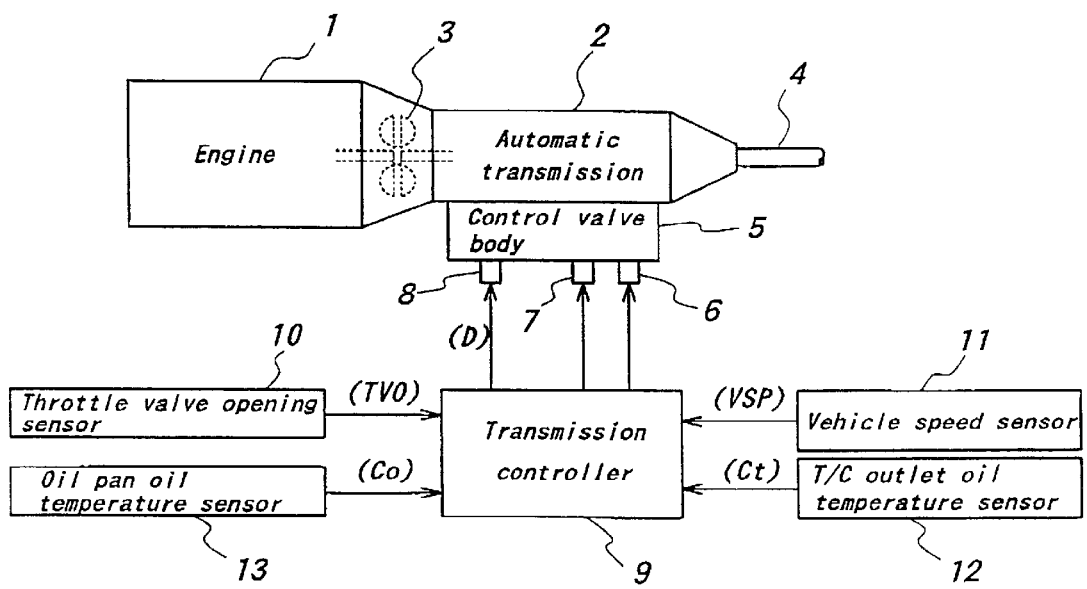
FIG. 1 is a schematic system diagram showing a vehicular power train provided with a slip limiter device in accordance with one embodiment of the present invention.

Referring now to the drawings, FIG. 1 shows a power train of a vehicle provided with a device for limiting slip at high temperature of a torque converter according to one embodiment of the present invention, together with a control system for an automatic transmission. Reference numerals 1 and 2 denote an engine and an automatic transmission, respectively. The automatic transmission 2 receives the power of the engine 1 through a torque converter 3, and changes the input rotation into an output rotation in accordance with a selected gear ratio, which is transmitted to an output shaft 4.

In the automatic transmission 2, the selected gear ratio is determined by the combination of ON and OFF states of shift solenoids 6 and 7 provided in a control valve body 5. In the torque converter 3, the slip rotation between an input element and an output element of the torque converter is limited by a duty control of a lockup solenoid 8 similarly provided in the control valve body 5.

When the drive duty D of the lockup solenoid 8 is near the lowest value, the torque converter 3 transmits power in a converter mode in which the input element and the output element of the torque converter are not directly coupled to each other (i.e., the slip rotation is not limited). On the contrary, when the drive duty D of the lockup solenoid 8 is near the highest value, the torque converter 3 transmits power in a lockup mode in which the input element and the output element of torque converter are directly coupled to each other (i.e., the slip rotation is zero). Furthermore, when the drive duty D of the lockup solenoid 8 takes a value between the near-lowest value and the near-highest value, the torque converter 3 transmits power in a slip control mode in which the connecting force between the torque converter input and output elements is strengthened with an increase in the drive duty D (i.e., the slip rotation is decreased).

The ON/OFF states of the shift solenoids 6 and 7 and the drive duty D of the lockup solenoid 8 are controlled by a transmission controller 9. To this end, the transmission controller 9 receives a signal from a throttle valve opening sensor 10 for detecting the throttle valve opening TVO of the engine 1 as a parameter representing the engine load, a signal from a vehicle speed sensor 11 for detecting the vehicle speed VSP from the rotational speed of the transmission output shaft 4, a signal from a torque converter outlet oil temperature sensor 12 for detecting the torque converter outlet oil temperature Ct, as well as a signal from an oil pan oil temperature sensor 13 for detecting the oil temperature Co in the oil pan of the automatic transmission 2.

Based on the above-mentioned input information, the transmission controller 9 carries out a speed change control in the manner known, per se. More specifically, the transmission controller 9 determines the optimum gear range for the present driving condition based on a predetermined speed change pattern, and performs a predetermined gear shift by turning on and off the shift solenoids 6 and 7 so that the optimum gear range is selected from the throttle valve opening TVO and the vehicle speed VSP as detected by the respective sensors 10, 11.

Figure 2:
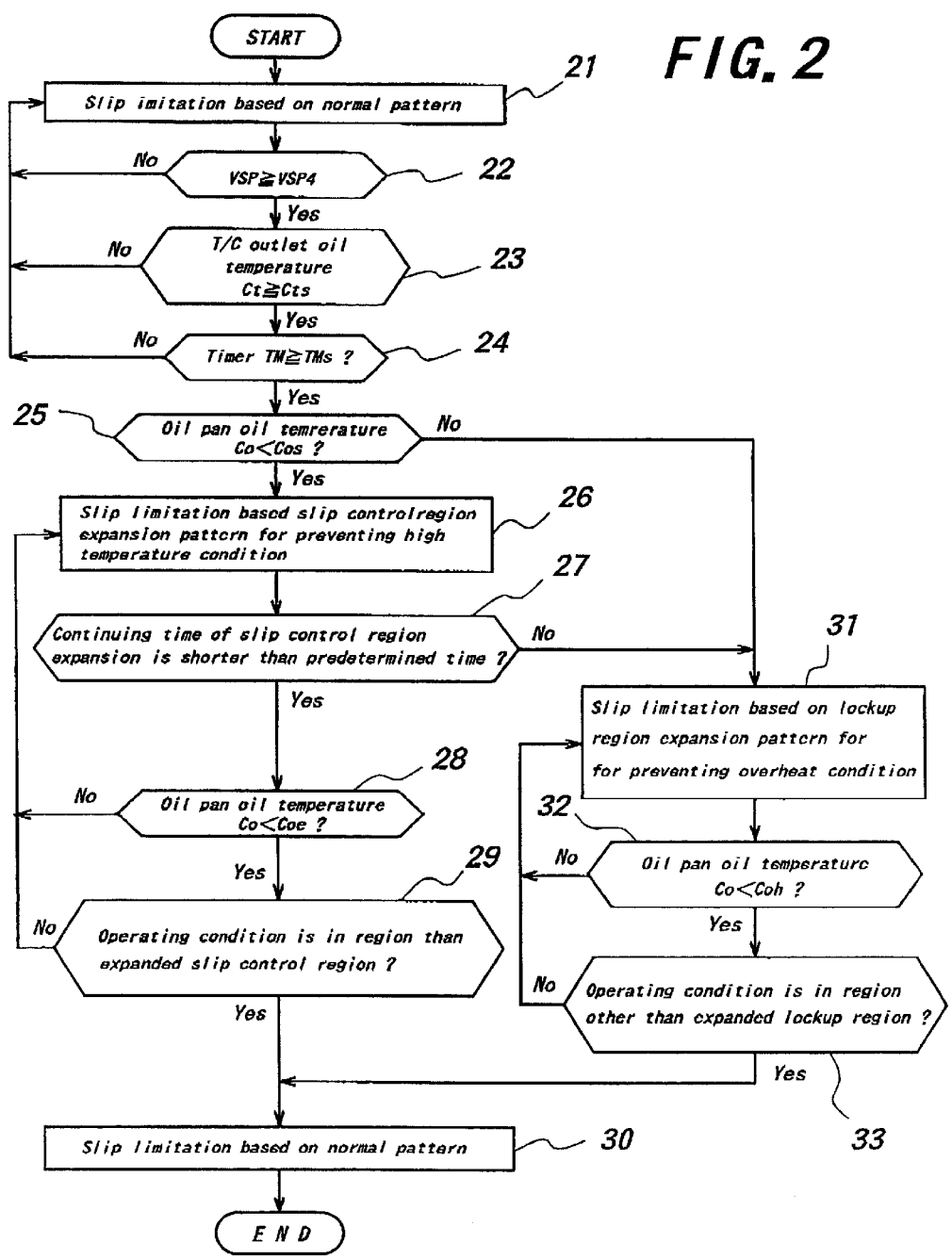
FIG. 2 is a flowchart showing the slip limiting operation of a torque converter executed by a transmission controller shown in FIG. 1.

The transmission controller 9 also performs a slip limiting control of the torque converter 3 by executing a control program to be described below with reference to FIG. 2. More specifically, in performing the slip limitation, in a first step 21, the transmission controller 9 performs the slip limitation of the torque converter 3 based on a slip limiting region pattern for the normal condition (other than the high-temperature condition), as shown in FIG. 3a, for example. It is noted that the thick solid line in FIG. 3a, as in the case of FIGS. 3b and 3c, indicates a fifth gear lockup start line for defining a fifth gear lockup region 5L/U, and a fourth gear lockup start line for defining a fourth gear lockup region 4L/U. A fifth gear lockup release line and a fourth gear lockup release line both indicated by a thick broken line are each set with a hysteresis with respect to the relevant start line. Also, the thin solid lines indicate slip control start lines for defining a fifth gear slip control region 5S/L, a fourth gear slip control region 4S/L, and a third gear slip control region 3S/L, respectively. A fifth gear slip control release line, a fourth gear slip control release line, and a third gear slip control release line indicated by the thin broken line are each set with a hysteresis with respect to the relevant slip control start line. It is noted that the reference character C/V in FIGS. 3a to 3c designates a converter region in which the torque converter 3 is to be made in the converter mode.

In the following, explanation will be made of the manner of slip limitation of the torque converter 3, which is performed by the transmission controller 9 based on the slip limiting region pattern for the normal temperature condition (i.e., other than the high temperature condition) as shown in FIG. 3a. With the lookup system from the table data corresponding to the slip limiting region pattern for the normal time shown in FIG. 3a, it is judged in which region the current running condition is included, based on the throttle valve opening TVO and the vehicle speed VSP. According to the judgment result, through the duty control of the lockup solenoid 8, (i) if the region is the converter region C/V, the torque converter 3 is made in the converter mode, (ii) if the region is the slip control region S/L, the torque converter 3 is in the slip control state; and (iii) if the region is the lockup region L/U, the torque converter is in the lockup mode.

On this occasion, the transmission controller 9 judges in step 22 whether or not the vehicle speed VSP is not lower than a fourth gear slip control start vehicle speed VSP4 shown in FIG. 3a. If VSP≧VSP4, judgment is made in step 23 whether or not the torque converter outlet oil temperature Ct is not lower than a predetermined oil temperature Cts, which is the standard for the judgment of whether or not high temperature measures should be taken. If Ct≧Cts, the judgment is made in step 24 whether or not the duration or elapsed time TM as measured by a timer from that moment has reached a predetermined time TMs. If it is judged in step 22 that VSP<VSP4, the slip limitation at the high temperature condition in accordance with the present invention is not performed in the illustrated embodiment. Also, if it is judged in step 23 that Ct<Cts, the torque converter outlet oil is at a temperature which does not require the slip limitation at the high temperature condition in accordance with the present invention, and if it is further judged in step 24 that TM<TMs, it is uncertain whether or not the slip limitation at the high temperature condition in accordance with the present invention must be performed. Therefore, the control is returned to step 21 to continue the above-described slip limitation of the torque converter 3 based on the slip limiting region pattern for the normal temperature condition as shown in FIG. 3a.

Another situation may occur wherein (i) it is judged in step 22 that VSP>VSP4, (ii) it is judged in step 23 that Ct≧Cts, and (iii) it is further judged in step 24 that the state in which both of the vehicle speed condition and the torque converter outlet oil temperature condition are met continues at least for the predetermined time TMs (TM≧TMs). In this instance, the control is put forward to step 25 and subsequent steps to perform the slip limitation as high temperature countermeasures according to the present invention is performed in the manner to be described below.

First of all, in step 25, depending upon whether or not the oil pan oil temperature Co is lower than a predetermined oil temperature Cos, it is judged whether or not the oil temperature in the oil pan is at a temperature for which the high temperature countermeasures can be taken by only the slip control of the torque converter 3.

If the oil pan oil temperature Co is lower than the predetermined oil temperature Cos, in step 26, the slip control as the high temperature countermeasures is carried out as follows. The fourth gear slip control region 4S/L and the fifth gear slip control region 5S/L in the slip limiting region pattern at the normal temperature condition shown in FIG. 3a are expanded toward a high-load operation region (large throttle valve opening) indicated by hatchings in FIG. 3b, and the region pattern shown in FIG. 3a is switched to a slip control region expanded pattern at the high-temperature condition shown in FIG. 3b as indicated by arrow α. Based on this, the slip limitation of the torque converter 3 is performed.

Owing to the expansion of the slip control regions 4S/L and 5S/L toward the high-load operation region (large throttle valve opening), the torque converter 3 has a tendency of decreased slip rotation at the time of high-load operation, so that the agitation of hydraulic oil caused by the torque converter 3 is suppressed by the decreased slip rotation, by which the high temperature countermeasures can be taken.

Since the above-described functional effects can be achieved by the expansion of the slip control regions 4S/L and 5S/L toward the high-load operation region (large throttle valve opening), shaking vibration and/or booming noise are not produced even in the high-load state. Also, it is possible to prevent deterioration in drivability and/or driving feel at the time of high-load operation, which had been inevitable when the expansion of the lockup region is relied upon in a conventional manner. Thus, it is possible to simultaneously take both of the countermeasures against deteriorated drivability and/or driving feel, as well as the overheat countermeasures.

Moreover, the expansion of the slip control regions 4S/L and 5S/L toward the high load side is not effected immediately after it is judged in step 23 that the torque converter outlet oil temperature Ct is not lower than the predetermined oil temperature Cts. Instead, the expansion of the slip control regions 4S/L and 5S/L toward the high load side is effected when it is judged in step 24 that the state of Ct≧Cts has continued at least for the predetermined time TMs. Therefore, the expansion is effected only when it is really necessary.

In the next step 27, it is judged whether or not the time for which the expansion of the slip control regions 4S/L and 5S/L toward the high load side is effected is shorter than a predetermined time, which is set at a limit value of the continuing time which does not hinder the slip control mode of the torque converter, as lengthened by the expansion of the slip control regions 4S/L and 5S/L.

When it is judged in step 27 that the time for which the expansion of the slip control regions 4S/L and 5S/L continues is shorter than the predetermined time, since the slip control mode as lengthened by the expansion of the slip control regions does not become hindrance, it is judged in step 28 whether or not the oil pan oil temperature Co has sufficiently decreased, as expected, to a value lower than a predetermined oil temperature Coe, at which the expansion of the slip control regions 4S/L and 5S/L can be released, as a result of the high temperature countermeasures by means of the expansion of the slip control regions 4S/L and 5S/L.

Until the oil pan oil temperature Co decreases to a value lower than the predetermined oil temperature Coe, the control is returned to step 26, and the slip limitation based on the pattern of FIG. 3b in which the slip control regions 4S/L and 5S/L are expanded is continued, by which the slip limitation as the high temperature countermeasures is performed continuously.

If it is judged in step 28 that the oil pan oil temperature Co has decreased to a value lower than the predetermined oil temperature Coe within the predetermined time in step 27, provided that it is judged in step 29 that the operating condition is in a region other than the slip limiting region expanded as indicated by hatchings in FIG. 3b, in step 30, the pattern is returned from the pattern shown in FIG. 3b to the normal pattern shown in FIG. 3a as indicated by the arrow β in FIG. 3, by which the normal slip limitation is restored.

As long as it is judged in step 29 that the operating condition is in the slip limiting region expanded as indicated by hatchings in FIG. 3b, the control is returned to step 26 and the slip limitation based on the pattern of FIG. 3b is continued so that the slip control regions 4S/L and 5S/L are expanded.

Thus, the restoration from the slip limitation as the high temperature countermeasures based on the pattern of FIG. 3b (step 26) to the normal slip limitation based on the normal pattern shown in FIG. 3a (step 30) is effected only when it is judged in step 29 that the operating condition is in a region other than the slip control region expanded as indicated by hatchings in FIG. 3b. That is to say, the restoration is effected only when the torque converter is in the same slip limiting mode at the time of restoration to the normal slip limitation and before the restoration, so that the restoration to the normal slip limitation is effected substantially without shock.

When the oil pan oil temperature is not sufficiently decreased contrary to expectation even by the slip limitation as the high temperature countermeasures based on the pattern of FIG. 3b in which the slip control regions 4S/L and 5S/L are expanded toward the high load side (step 26), and it is judged in step 25 that the oil pan oil temperature Co is not lower than the predetermined oil temperature Cos, the control is put forward to step 31, and the expanded regions (hatched regions) of the fourth gear slip control region 4S/L and the fifth gear slip control region 5S/L expanded toward the high load side as described above with reference to FIG. 3b are made a fourth gear lockup region 4L/U and a fifth gear slip control region 5L/U as shown in FIG. 3c. The slip control region expansion pattern at the high-temperature condition shown in FIG. 3b is switched to a lockup region expansion pattern at the overheat condition shown in FIG. 3c, as indicated by arrow γ in FIG. 3, so that the slip limitation of the torque converter 3 is performed.

Thus, when the decrease in temperature due to the expansion of the slip control regions 4S/L and 5S/L toward the high load side is not found, in the hatched region of FIG. 3c corresponding to that of FIG. 3b, the mode of the torque converter 3 changes from the slip control mode to the lockup mode. As a result, the torque converter 3 further suppresses agitation of hydraulic oil due to the slip rotation which has been further decreased to zero, thereby allowing the overheat countermeasures to be taken in a reliable manner.

It is judged whether or not torque converter hydraulic oil temperature is decreased by the control for placing the torque converter 3 in the lockup mode in the expanded region (hatched region) by judging in step 32 whether the oil pan oil temperature Co has decreased to a value lower than the predetermined oil temperature Coh at which the expansion of the lockup regions 4L/U and 5L/U may be released.

Until the oil pan oil temperature Co decreases to a value lower than the predetermined oil temperature Coh, the control is returned to step 31, to continue the slip limitation based on the pattern of FIG. 3c in which the lockup regions 4L/U and 5L/U are expanded, so that the slip limitation as the overheat countermeasures is performed continuously.

If it is judged in step 32 that the oil pan oil temperature Co has decreased to a value lower than the predetermined oil temperature Coh, provided that it is judged in step 33 that the operating condition is in a region other than the lockup region expanded as indicated by hatchings in FIG. 3c, in step 30, the pattern is returned from the pattern shown in FIG. 3c to the normal pattern shown in FIG. 3a as indicated by arrow δ in FIG. 3, by which the normal slip limitation is restored.

As long as it is judged in step 33 that the operating condition is in the lockup region expanded as indicated by hatchings in FIG. 3c, the control is returned to step 31, to continue the slip limitation based on the pattern of FIG. 3c in which the lockup regions 4L/U and 5L/U are expanded.

Thus, the restoration from the slip limitation as the overheat countermeasures based on the pattern of FIG. 3c (step 31) to the normal slip limitation based on the normal pattern shown in FIG. 3a (step 30) is effected only when it is judged in step 33 that the operating condition is in a region other than the lockup region expanded as indicated by hatchings in FIG. 3c. That is to say, the restoration is effected only when the torque converter is in the same slip limiting mode at the time of restoration to the normal slip limitation and before the restoration, so that the restoration to the normal slip limitation is effected without shock.

It may be judged in step 27 that the duration or continuing time of the state in which the slip control regions 4S/L and 5S/L shown in FIG. 3b are expanded toward the high load side (indicated by hatchings) is longer than the predetermined time. When the decrease in the oil temperature due to the expansion of the slip control regions 4S/L and 5S/L is not finished within this predetermined time, such a state continues for a long period of time for which the slip control mode of the torque converter, which is lengthened by the expansion of the slip control regions 4S/L and 5S/L, becomes hindrance. In this instance, the control is put forward to step 31, and the expanded regions of the slip control regions 4S/L and 5S/L shown in FIG. 3b are made lockup regions indicated by hatchings, so that the slip control for the high-temperature condition is stopped and the torque converter is made in the lockup mode. It is thus possible to avoid a disadvantageous state wherein the slip control mode against high temperature condition continues for a long period of time.

If it is judged in step 24 that the state in which it is judged in step 23 that Ct≧Cts has continued at least for the predetermined time TMs, the control is put forward to step 25. When it is judged in step 25 that the oil pan oil temperature Co is already at a high temperature such that the decrease in oil temperature cannot be attained by the expansion of the slip control regions 4S/L and 5S/L, that is, not lower than the predetermined temperature Cos, the control is directly put forward to step 31. As a result, the pattern at the normal time shown in FIG. 3a is directly switched to the lockup region expansion pattern shown in FIG. 3c without the expansion of the slip control regions 4S/L and 5S/L toward the high load side, and preference is given to a quick decrease in oil temperature caused by the slip limitation of the torque converter based on the above switching.

While the present invention has been described above with reference to a specific embodiment shown in the accompanying drawings, it has been presented for an illustrative purpose only, and various changes or modifications may be made without departing from the scope of the invention as defined by the appended claims.

What is claimed is:

1. A slip limiter device for limiting slip of a torque converter in a high temperature condition thereof, by carrying out a slip control for reducing slip rotation between an input element and an output element of said torque converter in a low-load operation region of an engine, or a lockup control for directly coupling said input and output elements to eliminate said slip rotation, wherein said slip control is carried out in a region which is expanded to a high-load operation region of the engine when a torque converter hydraulic oil is at a temperature not lower than a predetermined temperature.

2. The slip limiter device according to claim 1, wherein said slip control region is expanded when the torque converter hydraulic oil temperature is not lower than said predetermined temperature at least for a predetermined time.

3. The slip limiter device according to claim 2, wherein said torque converter is placed in the lockup mode in said expanded region when the expansion of said slip control region continues at least for a predetermined time.

4. The slip limiter device according to claim 3, wherein the control is returned from the lockup control in which said torque converter is placed in said lockup mode to a slip limiting control based on the normal slip limiting region pattern, when the torque converter hydraulic oil temperature is sufficiently decreased by a control in which said torque converter is placed in the lockup mode in said expanded region.

5. The slip limiter device according to claim 4, wherein the restoration to said normal slip limiting control is executed when the operating condition is in a region other than said expanded slip limiting region.

6. The slip limiter device according to claim 1, wherein said torque converter is placed in a lockup mode in said expanded region when the torque converter hydraulic oil temperature is not sufficiently decreased even by the expansion of said slip control region.

7. The slip limiter device according to claim 6, wherein the control is returned from the lockup control in which said torque converter is placed in said lockup mode, to the slip limiting control based on a normal slip limiting region pattern, when the torque converter hydraulic oil temperature is sufficiently decreased by said lockup control in which said torque converter is placed in the lockup mode in said expanded region.

8. The slip limiter device according to claim 7, wherein the restoration to said normal slip limiting control is executed when the operating condition is in a region other than said expanded slip limiting region.

9. The slip limiter device according to claim 6, wherein said torque converter is placed in the lockup mode in said expanded region when the expansion of said slip control region continues at least for a predetermined time.

10. The slip limiter device according to claim 9, wherein the control is returned from the lockup control in which said torque converter is placed in said lockup mode to a slip limiting control based on the normal slip limiting region pattern, when the torque converter hydraulic oil temperature is sufficiently decreased by a control in which said torque converter is placed in the lockup mode in said expanded region.

11. The slip limiter device according to claim 10, wherein the restoration to said normal slip limiting control is executed when the operating condition is in a region other than said expanded slip limiting region.

12. The slip limiter device according to claim 1, wherein the control is returned from the lockup control in which said torque converter is placed in said lockup mode to a slip limiting control based on a normal slip limiting region pattern, when the torque converter hydraulic oil temperature is sufficiently decreased by a control in which said torque converter is placed in the lockup mode in said expanded region.

13. The slip limiter device according to claim 12, wherein the restoration to said normal slip limiting control is executed when the operating condition is in a region other than said expanded slip limiting region.

14. The slip limiter device according to claim 1, wherein said torque converter is placed in the lockup mode in said expanded region when the expansion of said slip control region continues at least for a predetermined time.

15. The slip limiter device according to claim 14, wherein the control is returned from the lockup control in which said torque converter is placed in said lockup mode to a slip limiting control based on the normal slip limiting region pattern, when the torque converter hydraulic oil temperature is sufficiently decreased by a control in which said torque converter is placed in the lockup mode in said expanded region.

16. The slip limiter device according to claim 15, wherein the restoration to said normal slip limiting control is executed when the operating condition is in a region other than said expanded slip limiting region.

* * * * *